E. E. HOLT.
TIRE VALVE.
APPLICATION FILED NOV. 27, 1916.
1,244,330.
Patented Oct. 23, 1917.
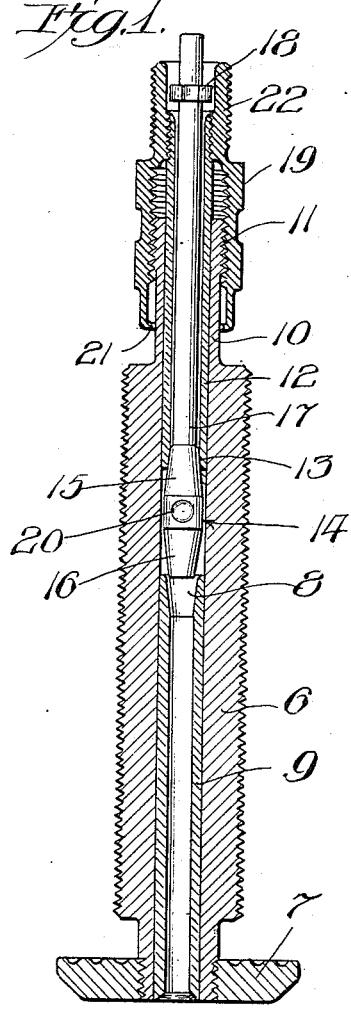
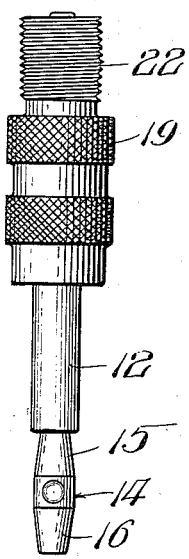
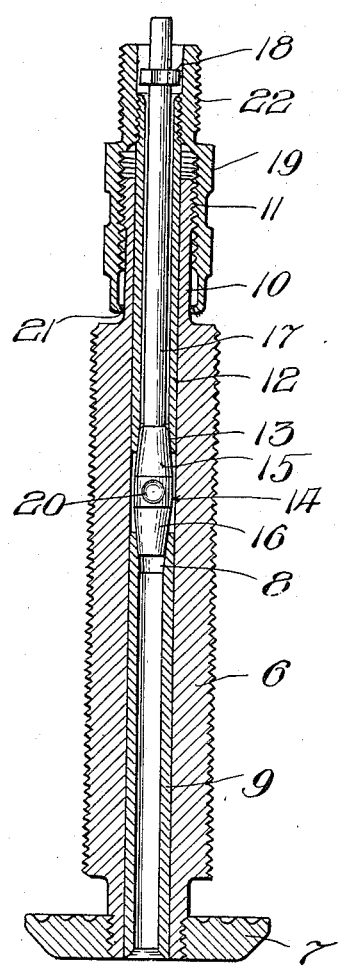
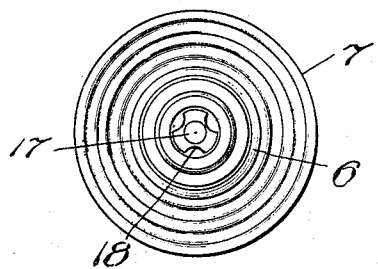
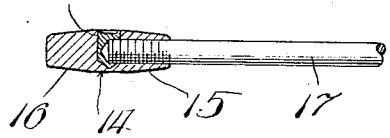

UNITED STATES PATENT OFFICE.

EDWARD E. HOLT, OF CHICAGO, ILLINOIS.

TIRE-VALVE.

1,244,330. Specification of Letters Patent. Patented Oct. 23, 1917.

Application filed November 27, 1916. Serial No. 133,734.

*To all whom it may concern:*

Be it known that I, EDWARD E. HOLT, a citizen of the United States, residing at Chicago, county of Cook, and State of Illinois, have invented certain new and useful Improvements in Tire-Valves, of which the following is a specification.

The present invention has to do with improvements in tire valves and the like, for use in connection with pneumatic tires. In order for a valve for this service to find favor, it must be of very simple construction, so that it can be manufactured from a minimum number of parts of simple form, and which can be readily assembled. It must also be constructed so that it will provide a very efficient seal against the leakage of air under high pressure, and it must also be of such form that this efficient seal will be maintained at all times. Furthermore, the valve should be so constructed that there will be no loss of air during the process of inflation, and during the process of making and opening the connections from the pump to the valve.

The use of springs and the like in connection with movable portions of pneumatic valves is very undesirable, not only from the standpoint of manufacture, but also from the standpoint of certainty of operation at all times after the parts have been assembled. Furthermore, the use of gaskets or washers or the like at the sealing surfaces, is also very undesirable. On the contrary, a metallic seal, if properly formed and assembled, will very thoroughly and efficiently insure against any loss of air by leakage or seepage.

Certain objects of the present invention are to provide a tire valve which shall embody the desirable features above mentioned, not only from the standpoint of manufacture, but also from the standpoint of subsequent operation.

Other objects and uses will appear from a detailed description of the invention, which consists in the features of construction and combinations of parts hereinafter described and claimed.

Referring to the drawings:

Figure 1 shows a longitudinal section through the assembled valve, the plunger and actuating sleeve being in raised position for inflation;

Fig. 2 shows a view corresponding to Fig. 1, the plunger and actuating sleeve being lowered into the sealing position;

Fig. 3 shows in elevation the plunger and actuating sleeve as removed from the body portion of the valve;

Fig. 4 shows a plan view corresponding to Figs. 1 and 2, except that it is on greatly enlarged scale; and Fig. 5 shows a fragmentary detail of the lower end of the plunger, the valve block being shown in cross-section.

In the several figures I have shown the features of my invention as being applied to a valve having a threaded stem 6 with a grooved flange 7. This grooved flange seats against the inner surface of the tube, and a lock nut or the like may be threaded down along the stem 6 so as to engage the outer surface of the tube in the usual manner. Furthermore, the stem 6 may be extended up through the felly of the wheel in the customary manner. If desired, a valve cap of suitable form may be seated onto the threaded stem, although this is a matter of convenience in any particular case and does not form any feature of the present invention.

At a suitable point within the bore of the stem 6 I provide an upwardly facing conical valve seat 8. In the particular construction illustrated, this valve seat is formed on the upper end of a tube 9, which tube is set up into the stem 6, but it will be understood that the valve seat 8 may be formed in any other suitable manner.

The upper portion 10 of the stem 6 is shown as being of reduced size and provided on its upper end with threads 11. Within the upper portion of the stem is slidably mounted a tubular member 12, the lower end of which is provided with a downwardly facing conical valve seat 13. The valve member 14 operates within the stem 6 between the seats 8 and 13. The upper portion 15 of this valve member is of conical formation and adapted to engage the valve seat 13 while the lower end 16 of the valve member 14 is also of conical formation and adapted to engage the valve seat 8. This valve member, therefore, is shown as comprising a pair of oppositely faced truncated cones.

The valve member 14 is connected to the lower end of the valve stem 17. The upper end of the valve stem carries an enlargement 18 of any suitable form, which enlargement is adapted to engage the upper end of the tubular member 12 at certain times. The valve stem 17 is of smaller size than the bore of the tubular member 12, and the enlargement 18 is of suitable form to permit air to pass by and down alongside of the valve stem.

The upper end of the tubular member 12 is connected to an actuating sleeve 19, which actuating sleeve engages the threads 11 of the extension 10 of the stem 6. Consequently, by turning the actuating sleeve, the tubular member 12 will be raised or lowered with respect to the stem 6. A convenient formation is that illustrated in the drawings, in which the upper end of the tubular member 12 is threaded into the actuating sleeve 19. A convenient form of attachment of the valve member 14 to the valve stem 17 is that shown in detail in Fig. 5. As shown in said figure, the valve member is threaded onto the lower end of the valve stem. In order to insure a permanent threaded connection, the valve member may be provided with a socket 20 communicating with the threads on the inner end of the valve stem, so that upon pouring a drop of lead or solder or the like into said socket, the parts will be permanently locked together.

Examination of Figs. 1 and 2 in particular will reveal the presence of an inturned flange or bead 21 on the lower end of the actuating sleeve 19. This flange will serve to limit the upward movement of the actuating sleeve, so that after the parts have been assembled, said sleeve cannot be removed from the upper end of the stem 6.

The parts may be conveniently assembled in the following manner: The tubular member 12 is threaded into the actuating sleeve 19. Thereupon the valve stem 17 is set into position through the tubular member. The valve member 14 is threaded onto the lower end of the stem, and permanently secured in the manner just described. Upon the completion of these operations, these parts will assume the condition shown in Fig. 3. It is to be observed that the distance between the valve member 14 and the enlargement 18 is sufficient to permit a desired amount of up and down movement of the valve member and the valve stem with respect to the valve seat 13. This amount of movement will be desired during the process of inflating the tire.

Having assembled the parts to the point thus described, the tubular member 12 is set down into the upper end of the stem 6, and then the actuating sleeve 19 is threaded down along said actuating stem. Finally, the lower end of the actuating sleeve is beaded in, as shown at 21, so that thereafter the actuating sleeve cannot be removed.

Upon threading the actuating sleeve downwardly the maximum distance, as shown in Fig. 2, the lower end 16 of the valve member 14 will be forced firmly into the conical valve seat 8. At the same time, the upper end 15 of the valve member will be forced firmly into engagement with the conical valve seat 13. Thus there will be formed a very perfect primary air seal by the lower end 16 of the valve, and also a very perfect secondary air seal by the upper end 15 of the valve.

Upon threading the actuating sleeve 19 upwardly, the distance between the valve seats 13 and 8 will be increased, so that one or the other or both of the ends of the valve member 14 will be disengaged from the corresponding valve seat. If the tire be under pressure at the time the actuating sleeve is thus unthreaded to raise the tubular member, the valve member 14 will be held in engagement with the valve seat 13, so that any leakage of air will be prevented during this raising operation. Thereupon an air-tube or the like may be connected to the threaded upper end 22 of the actuating sleeve for the purpose of inflating the tire.

During the inflating operation, the valve member will be forced downwardly away from the seat 13. If the amount of this downward movement be sufficient, then the lower end 16 of the valve member will seat against the valve seat 8 and thus prevent any further inflation. However, by limiting the downward movement of the valve stem, assurance will be had that such reseating will not occur. The upward movement of the actuating sleeve 19 will be limited by the bead 21, and the downward movement of the valve stem will not be resisted until the enlargement 18 engages the upper end of the tubular member 12. By properly proportioning the parts, assurance will be had that upon threading the actuating sleeve 19 upwardly the maximum distance, the enlargement 18 will be engaged by the upper end of the tubular member 12 before any reseating will occur. Upon having completed the inflating operation, the actuating sleeve must be threaded down so as to firmly seal both ends of the valve member against their respective valve seats.

While I have herein shown and described only a single embodiment of the features of my invention, still it will be understood that I am not limited to this embodiment except as I may limit myself in the claims.

I claim:

1. In a tire valve, the combination with a valve stem having a central outwardly facing conical recess, of a sleeve threaded onto the upper end of said valve stem, a smaller sleeve downwardly depending from the upper portion of the first mentioned sleeve, said smaller sleeve working within the bore of the valve stem and having on its lower end a downwardly facing conical valve seat, the lower edge of the first mentioned sleeve being inturned and adapted to engage with the fixed portion of the valve stem for the purpose of limiting the upward movement of said sleeve, a double conical valve between the valve seats aforesaid, a stem working freely within the second mentioned sleeve and having its lower end connected to said valve, and a stop on the upper end of said stem adapted to engage the upper end of the second mentioned sleeve after a predetermined amount of lost motion.

2. In a tire valve, the combination with a valve stem having a central longitudinal bore, of an upwardly facing valve seat in the central portion of said bore, a sleeve threaded onto the upper end of the valve stem, the lower edge of said sleeve being inturned and adapted to engage with a portion of the valve stem to limit the upward movement of said sleeve, a hollow sleeve working within the bore of the valve stem and having its upper end connected to the first mentioned sleeve, and its lower end suitably formed to present a downwardly facing conical valve seat, a double conical valve between said valve seats, a stem working within the second mentioned sleeve and having its lower end connected to said valve, and means on the upper end of said stem for causing the stem to travel with the second mentioned sleeve when said sleeve is raised more than a predetermined amount.

3. In a pneumatic valve, the combination with a valve stem having a central longitudinal bore, of an upwardly facing valve seat in the bore, a sleeve longitudinally movable with respect to the valve stem, said sleeve being adapted to engage with a portion of the valve stem to limit the upward movement of the sleeve, a hollow sleeve working within the bore of the valve stem and having its upper end connected to the first mentioned sleeve and its lower end suitably formed to present a contacting surface, a downwardly facing conical valve between the valve seat and the contacting surface, a stem working within the aforementioned sleeve and having its lower end connected to the valve, and means on the upper end of said stem for causing the stem to travel with the sleeve when the sleeve is raised more than a predetermined amount.

EDWARD E. HOLT.